United States Patent [19]
Ferrer et al.

[11] Patent Number: 5,819,804
[45] Date of Patent: Oct. 13, 1998

[54] HAND TOOL FOR TEMPORARY PLUGGING OF PIPE CONDUITS

[76] Inventors: Eduardo J. Ferrer, 5306 S. Huntington Dr. #D, El Sereno, Calif. 90032; Juan J. Miller, 1859 W. 169th St., Gardena, Calif. 90247

[21] Appl. No.: 667,220

[22] Filed: Jun. 19, 1996

Related U.S. Application Data

[63] Continuation-in-part of Ser. No. 500,633, Sep. 1, 1995, abandoned.

[51] Int. Cl.6 ..................................................... F16L 55/12
[52] U.S. Cl. ............................................... 138/89; 138/94
[58] Field of Search ................................. 138/89, 97, 93, 138/45, 46, 98, 103, 90

[56] References Cited

U.S. PATENT DOCUMENTS

| | | | |
|---|---|---|---|
| 1,747,933 | 2/1930 | Goodman et al. | 138/94 |
| 2,588,188 | 3/1952 | Weisman | 138/94 X |
| 3,015,469 | 1/1962 | Falk | 138/89 X |
| 3,173,449 | 3/1965 | Custer et al. | 138/93 |
| 3,692,059 | 9/1972 | Ice, Jr. | 138/89 |
| 3,763,896 | 10/1973 | Horne et al. | 138/89 |
| 4,584,755 | 4/1986 | Lundquist | 138/89 X |
| 5,119,861 | 6/1992 | Pino | 138/93 X |
| 5,224,516 | 7/1993 | McGovern et al. | 138/93 X |
| 5,357,763 | 10/1994 | Vogel | 138/93 X |
| 5,558,130 | 9/1996 | McCabe et al. | 138/98 X |

*Primary Examiner*—Patrick F. Brinson
*Attorney, Agent, or Firm*—Natan Epstein

[57] ABSTRACT

An instrument for temporarily sealing a pipe against fluid flow comprising a manually actuatable handle and a sealing unit engaged to the handle, the sealing unit having a seal assembly supported at one end of a flexible cable operatively connected to the handle. The sealing assembly comprising an elastomeric seal contained between first and second compression elements which compress the elastomeric seal into an expanded state upon actuation of the handle.

19 Claims, 3 Drawing Sheets

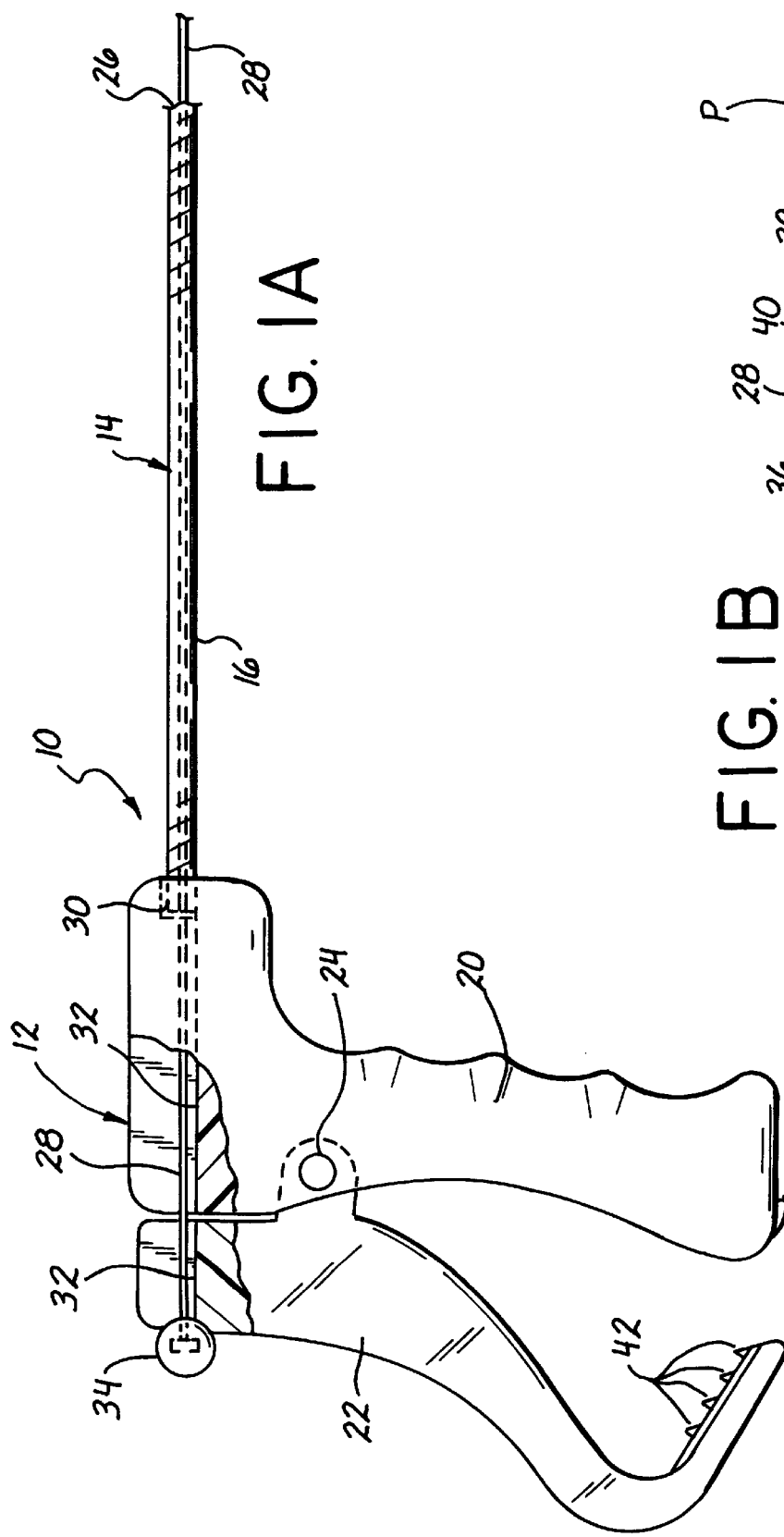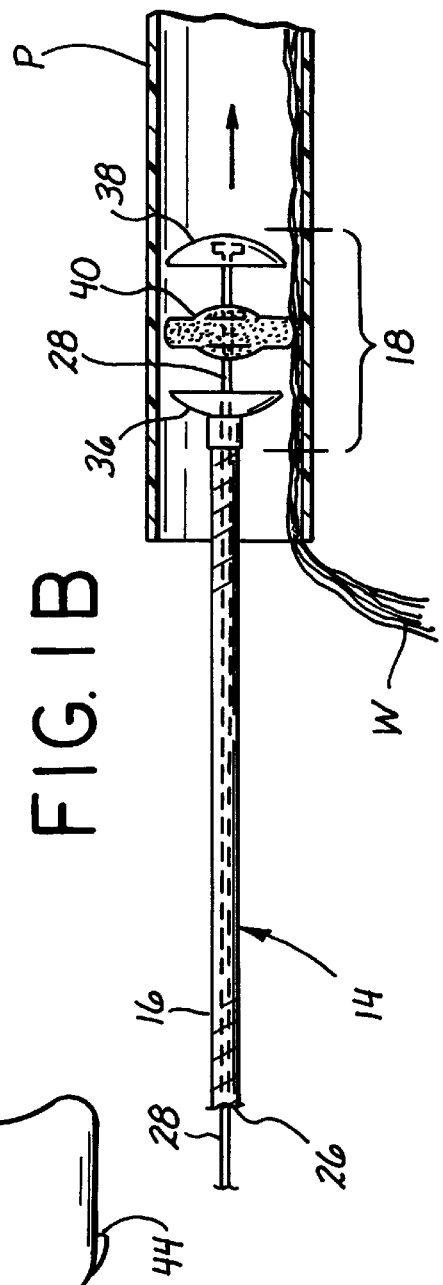

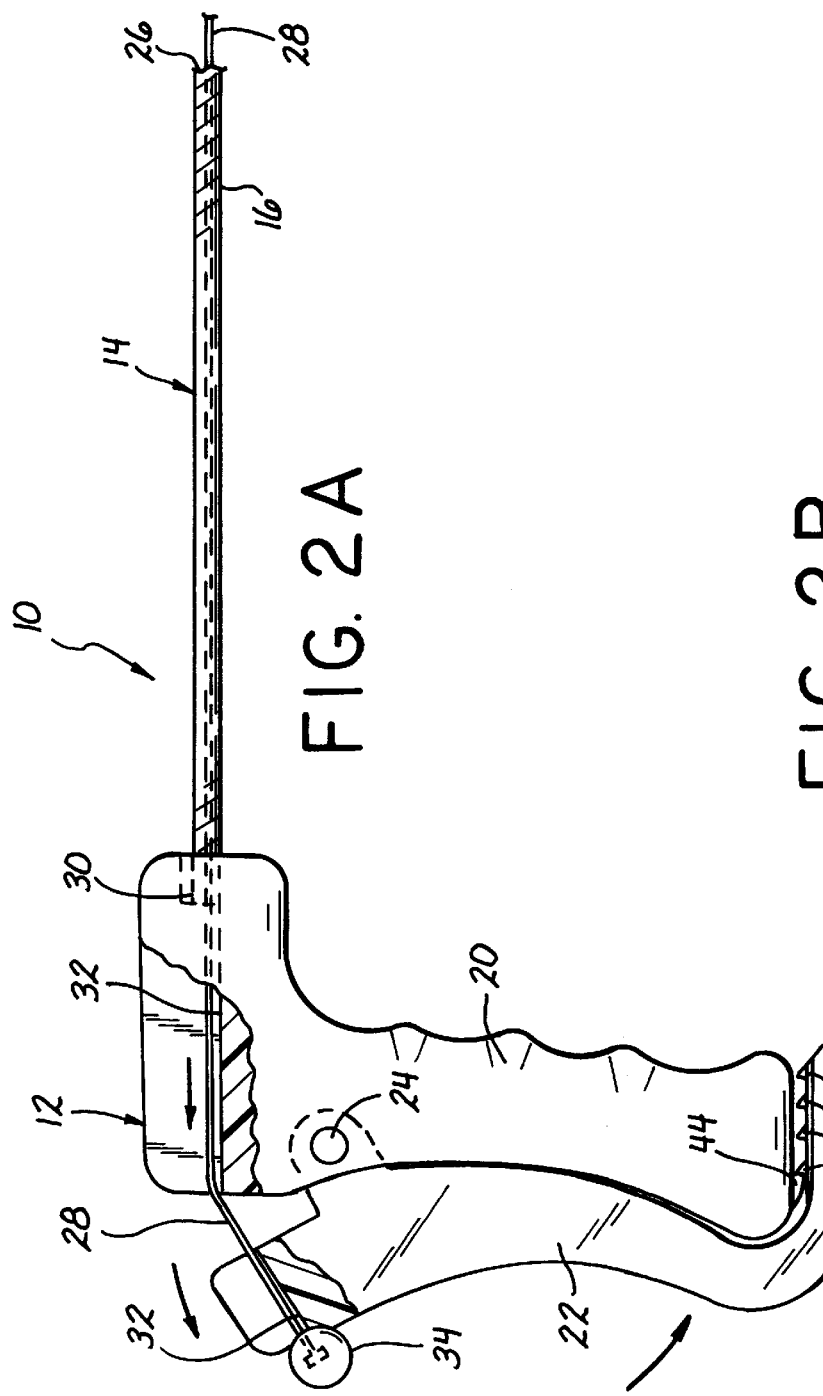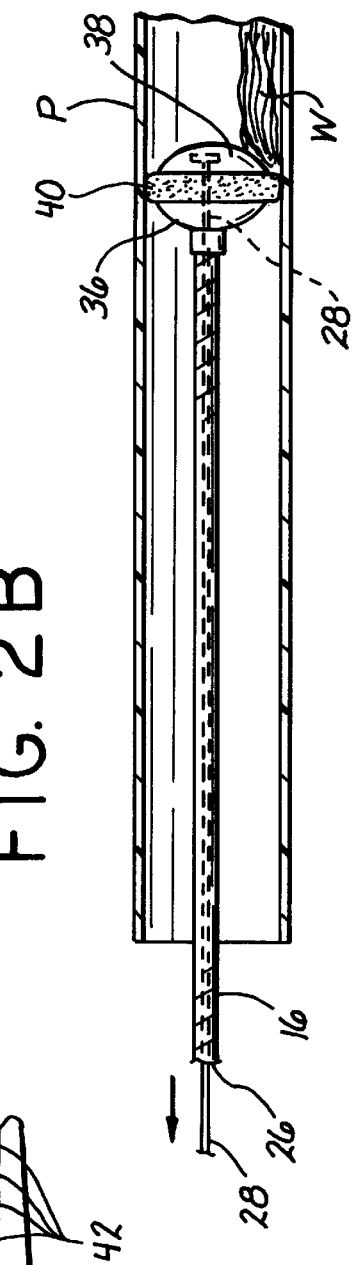

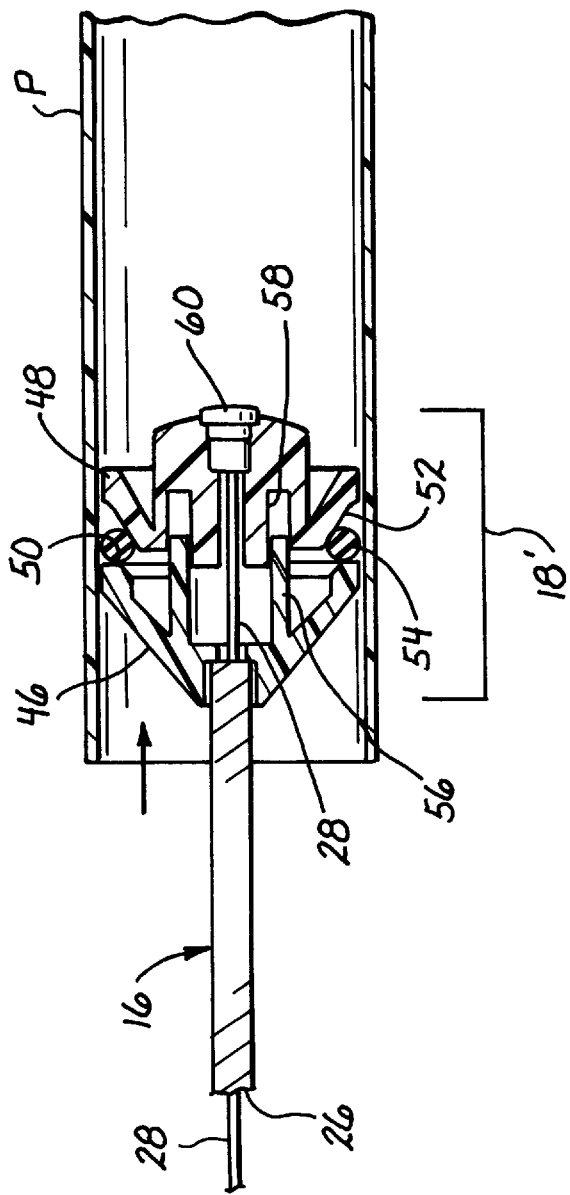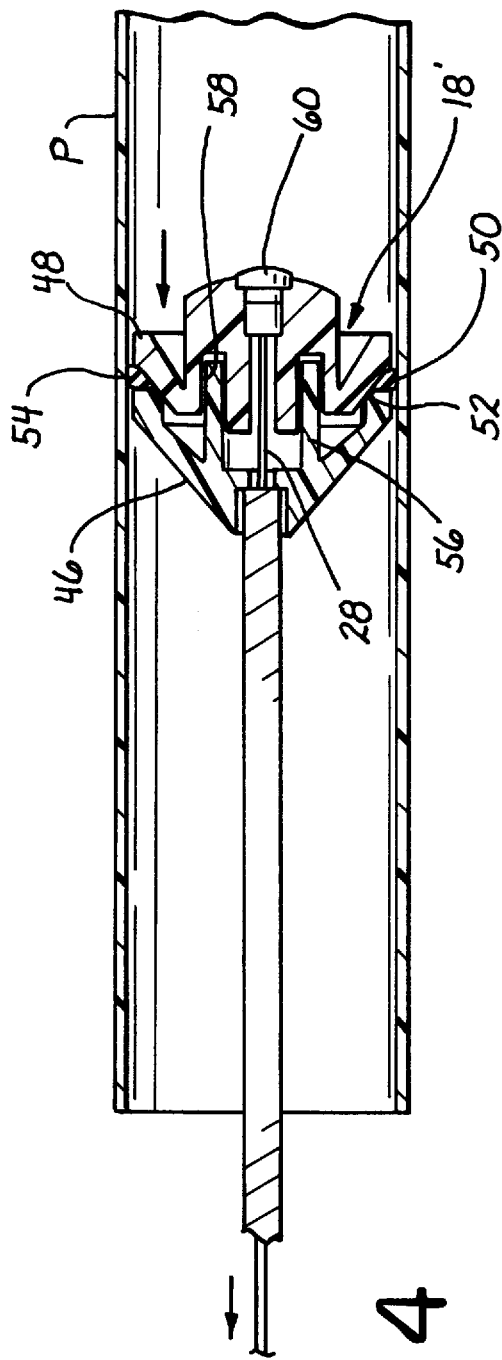

HAND TOOL FOR TEMPORARY PLUGGING OF PIPE CONDUITS

This application is a continuation-in-part of patent application Ser. No. 08/500,633, filed Sep. 1, 1995 now abandoned.

BACKGROUND OF THE INVENTION

1. Field of the Invention

This invention relates to the field of tools used in the installation and maintenance of plumbing conduits and pipe, and in particular concerns a hand operated tool for temporarily plugging pipe to exclude liquid during a pipe soldering operation or while other work is done on or near the open pipe end.

2. State of the Prior Art

Many tools are known and used in the plumbing trade for the aforementioned purpose. In general, such tools have a seal element which is introduced into an open end of a pipe to be soldered and are expanded in diameter to make a water tight seal inside the pipe.

The existing tools are cumbersome and costly. A continuing need exists for such tooling which is easier and more convenient to operate and is lower in cost.

SUMMARY OF THE INVENTION

The present invention addresses the aforementioned need by providing an instrument for temporarily sealing a pipe against fluid flow which has a manually actuatable handle and a sealant unit engaged to the handle. The sealant unit has a seal assembly and a flexible cable operatively connecting the handle and the seal assembly. The seal assembly has an elastomeric seal contained between first and second compression elements along an axial direction of the cable. The cable is operative for urging the compression elements together thereby to achieve expansion of the elastomeric seal in a radial direction responsive to manual actuation of the handle from a normal to a depressed condition. Preferably the actuating handle includes locking elements for retaining the handle in a depressed condition when actuated, so that sealing engagement of the seal with the interior surface of a pipe can be maintained without further effort on the part of the user while repair or maintenance work is performed on the pipe.

The actuating handle may have first and second handle members, such as a handgrip and a lever, movable relative to one another from a normal to a depressed condition. The cable may have a sleeve connected at one end thereof to the first handle member and at an opposite end thereof to one of the compression elements, and a wire axially slidable in the sleeve, the wire being connected at one end thereof to the second member of the handle and at an opposite end thereof to another of the compression elements, such that the wire is retracted into the sleeve responsive to relative movement of the handle members. The wire may pass through the first compression element and through the elastomeric seal.

In one form of the elastomeric seal the seal element is expanded to an increased radius by axial compression of the seal element between the compression elements. In such case the seal element may be disk shaped and axially mounted to the cable. In another form of the invention the elastomeric seal is ring shaped and is expanded by stretching to an increased radius, as by being displaced axially on a tapering surface such as a conical surface. In the latter case, one compression element has the tapering surface and the other compression element urges the seal element along the tapering surface in a direction of increasing width to stretch the seal element. The tapering surface may be a frusto-conical surface coaxial to the cable.

The first element of the handle may be a handgrip and the second element of the handle may be a depressible lever pivoted to the handgrip. The locking elements of the actuating handle may be detent elements on each of the handgrip and the lever engageable with each other upon depression of the lever. The detent elements may operate in the manner of a ratchet, such as a series of teeth on said depressible lever sequentially engageable with a tooth detent on the handgrip during progressive depression of the lever. Desirably, the locking elements will retain the lever against return to a normal condition through a range of depressed conditions until the locking elements are disengaged from each other by the user of the tool.

In the presently preferred form of the invention the sealant unit is removably engaged to the handle such that different sealant units, each having an elastomeric seal of different radial dimension, may be interchangeably engaged to the handle so as to fit a pipe of given standard diameter. That is, the cable may be disengageable from the handle such that different sealant units each having its own cable and seal assembly may be interchangeably engaged to the handle, so that a tool kit including multiple sealant units each with a seal assembly of different diameter may be provided.

BRIEF DESCRIPTION OF THE DRAWINGS

FIG. 1A is a side view partly in section showing the hand grip in normal position;

FIG. 1B is a side view of the seal assembly inserted into a pipe in the normal condition corresponding to the handle position of FIG. 1A;

FIG. 2A is a view as in FIG. 1A showing the hand grip in depressed condition for actuating the seal assembly;

FIG. 2B is a view of the seal assembly actuated to an expanded diameter for making sealing engagement with the interior wall surface of the pipe;

FIG. 3 is a sectional view in an axial direction of an alternate seal assembly suitable for larger diameter pipe, the seal being shown in its normal condition within a pipe; and FIG. 4 show the seal of FIG. 3 in actuated condition to make sealing engagement with the interior wall surface of the pipe.

DETAILED DESCRIPTION OF THE PREFERRED EMBODIMENTS

With reference to the accompanying drawings, The hand tool shown in part in each of FIGS. 1A and 1B, generally designated by the numeral 10, has an actuating handle 12 to which is removably attached an interchangeable sealant unit 14. The sealant unit 14 includes a flexible cable 16 and a seal assembly 18.

The handle 12 has a handgrip 20, and a lever 22 pivoted by a spindle at 24 to the handgrip. The handgrip, lever and spindle may all be made of a suitable heat resistant plastic. Depression of the lever to the depressed position shown in FIG. 1B, as by squeezing the handle in the hand of an operator, causes the upper ends of the lever and the handgrip to move apart from each other.

The cable 14 has an outer sleeve 26 and a wire 28 axially slidable in the sleeve. The wire may be 1/16th inch flexible steel wire (braided type), while the sleeve may be a flexible steel tubing, approximately 20 inches long and 5/32" in diameter. One end 25 of the sleeve is fitted to the upper end of the handgrip at 30 and the corresponding end of the wire lies within a channel, slot or groove 32 extending along the upper ends of both the handgrip and the lever and is engaged to the upper end of the lever by an enlarged ball-shaped plastic anchor 34. That is, an exposed portion of the wire 24 extends from the end 30 of the cable sleeve along the slot 32, so that the wire end is removably secured by the ball 34 at one end of the slot and the sleeve end 30 is removably secured to the handle at the opposite end of the slot 32. The length of the exposed wire portion in the slot is such as to maintain sufficient tension against the handle at the opposite ends of the slot to retain engagement of the cable to the handle.

The opposite end of the sleeve 26 carries a stationary compression plate 36. The wire passes through the center of the stationary compression plate 36 and through a disk shaped elastomeric seal 40, and supports at its opposite end a movable compression plate 38. The seal 40 is disk shaped with a lens shaped central area of increased cross-sectional thickness, as seen in FIG. 1B. The compression plates 36, 38 are circular and dished to generally conform to the convex curvature of the lens shaped center of the seal 40. The diameter of the compression plates 36, 38 is slightly undersized to the diameter of the pipe P, as is the normal, uncompressed diameter of the seal 40.

Actuation of the handle 12 causes the upper end of the lever to pull on the wire anchor 34 by means of the ball anchor 34, retracting the wire 28 into the sleeve 26 and urging the movable compression plate 38 against the stationary compression plate 36. The elastomeric, e.g. rubber, seal 40 is compressed between the plates 36, 38 in an axial direction of the wire 28 and expands in a radial direction of the wire 28. In an initial uncompressed condition of the seal 40, shown in FIG. 1B, the seal has a diameter smaller than the inside diameter of the pipe P which is to be temporarily plugged. Upon actuation of the handle 12 the diameter of the seal 40 expands into sealing engagement with the interior of the pipe P, as illustrated in FIG. 2B, to contain water flow W.

The handle 12 has locking elements operative for retaining the lever 22 in depressed condition, so as to maintain sealing engagement of the seal element 40 with the pipe P without further manual force applied to the handle 12. The locking elements, shown in disengaged condition in FIG. 1A, are a series of four teeth 42 on an upward facing surface of the bottom of the lever 22. The teeth 42 sequentially engage with a detent tooth 44 dependent from the bottom of the handgrip 20 as the lever is depressed towards the handgrip 20, in the manner of a ratchet. Sealing engagement with the pipe P is maintained until the interlocking teeth 42, 44 are disengaged from each other and the lever 22 is returned to its initial position of FIG. 1A, allowing the wire 28 to extend from the sleeve and slide to its normal position in the same Figure thereby separating the two compression plates 36, 38 which in turn permits the elastomeric seal 40 to expand axially and retract radially to its normal diameter. The seal assembly 18 may then be withdrawn from the pipe P by pulling away the handle 12.

The sealant unit 14 is interchangeable on the handle 12 with other similar sealant units which differ in the diameter of the elastomeric seal 40, and in the size of the compression plates 36, 38 needed for compressing each particular size of elastomeric element. The operation of each interchangeable sealant unit 14 by means of the actuating handle 12 remains the same.

FIGS. 3 and 4 depict an alternative form 18' of the seal assembly for use with the actuating handle 12 according to this invention. The alternate seal 18' also has two compression elements 46 and 48 which have an annular surface 50 on one compression element axially facing a frusto-conical surface 52 coaxial with wire 28 on the other compression element. An elastomeric element in the form of annular rubber gasket 54 is seated on the frusto-conical surface 52 near the smaller diameter, inner end of the surface 52. A cylindrical projection 56 of the compression element 46 slides axially in a cylindrical recess 58 defined in the compression element 48, to restrict the two compression elements to axial movement relative to each other in response to actuation of the handle 12. Actuation of the seal assembly 18' is similar to that described in connection with the seal assembly 18 of FIGS. 1A through 2B. Depression of the lever 22 relative to the handgrip 20 causes retraction of the wire 28 into the sleeve 26. The end of the wire is anchored at 60 to the center of compression element 48 and draws that compression element against compression element 46. The annular surface 50 advances axially against the frusto-conical surface 52 and urges the annular gasket 54 towards the larger diameter end of the frusto-conical surface 52, thereby stretching the gasket 54 from its normal, initial diameter of FIG. 2 to an expanded outer diameter which, as shown in FIG. 4, slightly exceeds the outer diameter of both compression elements 46 and 48. The radial dimensions of the compression elements, the taper of the frusto-conical surface 52 and the expanded outer diameter of the rubber gasket 54 are selected and configured such that the periphery of gasket 54 makes radial sealing engagement with the cylindrical interior wall of a pipe P of given diameter.

Pipes typically encountered in the plumbing trade, primarily copper pipe, are in a relatively small number of standardized pipe diameters, and the present invention contemplates a tool kit which includes an actuating handle 12 and a number of sealant units 14, each sealant unit having a seal assembly 18, 18' sized to make sealing engagement with a different pipe diameter, so as to cover a range of pipe diameters, preferably a range of pipe diameters most likely to be encountered by the plumbing personnel for whom the tool kit is intended.

It has been found that the seal assembly configuration of FIGS. 1B, 2B while relatively simple to make, is best suited for smaller diameter pipes, for example, from about one-half inch diameter to about one inch in diameter due to the greater compression force needed to achieve sufficient radial expansion in larger sizes of the elastomeric seal 40. The more complex seal assembly of FIGS. 3 and 4 is easier to actuate for larger diameters of the elastomeric gasket 54 than the disk seal 40 of FIGS. 1B, 2B.

As best seen in FIG. 1A the slot 34 contains an exposed portion of the wire 28 between the cable end 30 and the end ball 34, and is open in a vertical direction. Exchange of one sealant unit 14 for another is easily accomplished in the field simply by lifting the ball end 34 out of engagement with the lever 22, which then permits the cable end 30 to be lifted out of engagement with the handgrip 20. The wire 28 simply lifts out of the groove or slot 32 defined along the tops of the lever and the handgrip.

The water supply valve (not shown in the drawings) to the pipe P should be closed during repair or maintenance procedures using the tool 10 of this invention because the seal assemblies 18 and 18' are not intended to seal against a high pressure water supply, but rather to exclude residual water W in the pipe system from the portion of the pipe P being worked on.

While certain preferred embodiments of the invention have been described and illustrated for purposes of clarity and example, it must be understood that many changes, substitutions, and modifications to the described embodiments will become obvious to those possessed of ordinary skill in the art without thereby departing from the scope and spirit of the present invention which is defined by the following claims.

What is claimed is:

1. An instrument for temporarily sealing a pipe against fluid flow, comprising:

a manually actuatable handle having a handgrip and a depressible lever pivoted to said handgrip;

a seal assembly comprising an elastomeric seal contained between first and second compression elements, a cable having a sleeve connected between said handgrip and one of said compression elements, and a wire axially slidable within said sleeve connected between said lever and the other of said compression elements, said cable being operative for urging said compression elements together thereby to achieve expansion of said elastomeric seal radially to said cable responsive to manual depression of said handle against said handgrip; and interlocking elements on each of said handgrip and said lever mutually engageable upon depression of the lever for retaining the lever in depressed condition.

2. The instrument of claim 1 wherein both said sleeve and said wire are disengageable from said handle such that different seal assemblies each having a said cable may be interchangeably engaged to said handle.

3. The instrument of claim 1 wherein said interlocking elements are operative for retaining said lever against return to said normal condition through a depressed range of said lever relative to said handgrip.

4. The instrument of claim 1 wherein said elastomeric seal is generally disk shaped and said compression elements compress a center portion of said elastomeric seal to achieve radial expansion of said seal.

5. The instrument of claim 1 wherein said elastomeric seal is ring shaped and said compression elements are operative for achieving said expansion by stretching said seal to an expanded outer diameter.

6. An instrument for temporarily sealing a pipe against fluid flow, comprising:

a manually actuatable handle and a sealant unit engaged to said handle, said sealant unit having a seal assembly supported at one end of a flexible cable operatively connecting said handle and said seal assembly, said seal assembly comprising an elastomeric seal contained between first and second compression elements along an axial direction of said cable, said cable comprising a sleeve and a wire axially slidable in said sleeve, said wire including an exposed portion extending from one end of said sleeve, said one end of said sleeve being removably engaged to a first member of said handle, said exposed portion of said wire being removably engaged to a second member of said handle, such that different sealant units each having said elastomeric seal of different radial dimension may be interchangeably engaged to said handle, said first member and said second member being manually movable for effecting relative axial displacement of said wire through said sleeve thereby urging said compression elements together to achieve expansion of said elastomeric seal.

7. The instrument of claim 6 wherein said exposed portion of said wire and said one end of said sleeve are engaged to said handle at opposite ends of a slot defined in both said first member and said second member, and said exposed portion can be readily removed from said slot for disengaging said cable from said handle.

8. The instrument of claim 6 further comprising interlocking elements of each of said first member and said second member operative for retaining said handle in a depressed condition thereby to hold said seal in said expanded condition.

9. The instrument of claim 6 wherein said interlocking elements include a ratchet operative for retaining said handle through a range of depressed conditions.

10. The instrument of claim 6 further comprising releasable locking means for retaining said handle in said depressed condition, thereby to hold said seal in a radially expanded condition.

11. The instrument of claim 6 wherein said wire passes through said first compression element and said elastomeric seal.

12. The instrument of claim 6 wherein said seal element is disk shaped and axially mounted to said cable.

13. The instrument of claim 6 wherein said seal element is annular and supported on an surface tapering in an axial direction of said cable.

14. The instrument of claim 6 wherein said first element of said handle is a handgrip and said second element of said handle is a depressible lever pivoted to said handgrip.

15. The instrument of claim 14 further comprising locking means for retaining said lever in depressed condition relative to said handgrip.

16. The instrument of claim 15 wherein said locking means comprise detent elements on each of said handgrip and lever engageable with each other upon depression of said lever.

17. The instrument of claim 16 wherein said detent elements comprise a ratchet on said depressible handle and a tooth detent on said handgrip.

18. An instrument for temporarily sealing a pipe against fluid flow, comprising:

a handle having first and second handle members manually movable to a depressed condition;

a sealant unit having an elastomeric seal contained between first and second compression elements and a cable comprising a sleeve and a wire axially slidable in said sleeve;

said sleeve and said wire being secured to said compression elements and to said first and second handle members respectively for actuating said seal between a normal unexpanded condition and an expanded condition responsive to actuation of said handle to a depressed condition;

said wire and said sleeve being engaged to said handle at opposite ends of a slot defined in both said first member and said second member, said wire and said sleeve being readily disengageable from said handle such that different sealant units having different sized seals may be interchangeably engaged to said handle.

19. The instrument of claim 17 wherein said exposed portion of said wire has an enlarged ball element for removably securing the wire at one end of said slot.

* * * * *